US005602659A

United States Patent [19]
Adachi et al.

[11] Patent Number: 5,602,659
[45] Date of Patent: Feb. 11, 1997

[54] LIQUID CRYSTAL LIGHT VALVE WITH PHOTOCONDUCTOR INCLUDING LIGHT ABSORBING AND LIGHT BLOCKING LAYERS OF NON-ALLOY AMORPHOUS SILICON

[75] Inventors: Katsumi Adachi, Nara-ken; Takashi Hayakawa, Soraku-gun; Shiro Narikawa, Kashihara, all of Japan

[73] Assignee: Sharp Kabushiki Kaisha, Osaka, Japan

[21] Appl. No.: 384,359

[22] Filed: Feb. 2, 1995

Related U.S. Application Data

[63] Continuation of Ser. No. 20,632, Feb. 22, 1993, abandoned.

[30] Foreign Application Priority Data

Feb. 21, 1992 [JP] Japan ..................... 4-035163

[51] Int. Cl.$^6$ ................................................ G02F 1/135
[52] U.S. Cl. ................................. 349/27; 349/29
[58] Field of Search ........................... 359/67, 72

[56] References Cited

U.S. PATENT DOCUMENTS

| | | | |
|---|---|---|---|
| 4,540,647 | 9/1985 | Borsenberger | 430/128 |
| 4,925,276 | 5/1990 | McMurray, Jr. et al. | 359/67 |
| 5,084,777 | 1/1992 | Slobodin | 359/72 |
| 5,233,450 | 8/1993 | Hatano et al. | 359/72 |
| 5,239,397 | 8/1993 | Hayakawa et al. | 359/72 |
| 5,272,554 | 12/1993 | Ji et al. | 359/67 |
| 5,324,549 | 6/1994 | Hayakawa et al. | 359/72 |

FOREIGN PATENT DOCUMENTS

| | | |
|---|---|---|
| 0288910 | 11/1988 | European Pat. Off. |
| 0422645 | 4/1991 | European Pat. Off. |
| 0503570 | 9/1992 | European Pat. Off. |
| 58-34435 | 2/1983 | Japan |
| 3-126920 | 5/1991 | Japan |

OTHER PUBLICATIONS

N. Takahashi, et al., "High-Speed Light Valve Using an Amorphous Silicon Photosensor and Ferroelectric Liquid Crystals", *Applied Physics Letters*, vol. 51, No. 16, Oct. 1987, pp. 1233–1235.

M. Nesladek, et al., "Amorphous Silicon Vidicon Target", *Journal of Non-crystalline Solids*, vol. 90, 1987, pp. 251–254.

*Primary Examiner*—Anita Pellman Gross
*Attorney, Agent, or Firm*—David G. Conlin; George W. Neuner; Milton Oliver

[57] ABSTRACT

A photoconductor coupled liquid crystal light valve comprising at least a pair of transparent electrode, a liquid crystal layer and a photoconductive layer showing blocking properties both sandwiched between said transparent electrodes, wherein said photoconductive layer includes a light absorbing layer and a blocking layer having a band gap wider than said light absorbing layer, both said light absorbing layer and said blocking layer being formed of non-alloy a-Si; and a method for manufacturing said photoconductor coupled light valve wherein said photoconductive layer is prepared with electron cyclotron resonance method.

3 Claims, 3 Drawing Sheets

LIQUID CRYSTAL LIGHT VALVE WITH PHOTOCONDUCTOR INCLUDING LIGHT ABSORBING AND LIGHT BLOCKING LAYERS OF NON-ALLOY AMORPHOUS SILICON

This is a continuation of application Ser. No. 08/020,632, now abandoned filed on Feb. 22, 1993.

BACKGROUND OF THE INVENTION

1. Field of the Invention

The present invention relates to a photoconductor coupled liquid crystal light valve and a method for manufacturing the same. More particularly it relates to a photoconductor coupled liquid crystal light valve using the photoconductive effect of a photoconductive material and the electro-optical effect of a liquid crystal and to a method for manufacturing the same.

2. Description of the Related Art

FIG. 4 shows a general construction of liquid crystal light valves. Liquid crystal light valves comprise a photoconductive layer 10, a liquid crystal layer 2, a pair of transparent electrodes 3 disposed by sandwiching therebetween the photoconductive layer 10 and the liquid crystal layer 2, means 4 for applying voltage including said transparent electrodes 3, a reflecting layer 5 and an orientation treatment film 6 disposed between the photoconductive layer 10 and the liquid crystal layer 2. On the external surfaces of the transparent electrodes 3 are disposed a pair of glass substrates 7.

A basic behavior of liquid crystal light valve devices is illustrated hereinbelow. For the sake of explanation, it is assumed that the resistance value of the reflecting layer 5 and the orientation treatment layer 6 is considerably smaller than that of the photoconductive layer 10 and the liquid crystal layer 2.

Applying voltage $V_o$ to the photoconductive layer 10 and the liquid crystal layer 2 from means 4 for applying voltage energizes the photoconductive layer 10 and the liquid crystal layer 2 at a voltage corresponding to the resistance value of respective layers. When the photoconductive layer 10 is not irradiated with light, the resistance applied to the photoconductive layer 10 exhibits a large value to result in a low voltage applied to the liquid crystal layer 2, which is even lower than a threshold voltage. $V_{th}$ generating an electro-optical effect.

Then, applying a writing light 8 to the photoconductive layer 10 in a pattern formed by introducing or shielding light coming from the side of the photoconductive layer 10 reduces a resistance at a portion of the photoconductive layer 10 irradiated with light 9 thereby increasing voltage applied to a portion of the liquid crystal layer 2 irradiated with light coming from the side of the photoconductive layer 10. The voltage at this point becomes larger than the threshold voltage $V_{th}$, an electro-optical effect generates in the liquid crystal layer 2, thereby allowing writing an image in the liquid crystal layer 2. This written image is fetched as an image 19 constituted by the absence or the presence of reflected light art he reflecting layer 5 by applying a reading light 9 from the side of the liquid crystal layer 2.

A light valve operating in the above way must satisfy the following formula to store a favorable image with a clear contrast. In the formula, $R_{PCL}$ designates a resistance value of the photoconductive layer in a region irradiated with light, $R_{LC}$ a resistance value of the liquid crystal, $R_{PCD}$ a resistance value of the photoconductive layer in a region not irradiated with light;

$$R_{PCL} \ll R_{LC} \ll R_{PCD} \qquad (1)$$

Assuming that the photoconductive layer 10 (or 1 in FIG. 1) and the liquid crystal layer 2 has approximately the same thickness, the formula can be represented by replacing resistance values with resistivity values. In other word, the following formula can be produced;

$$P_{PCL} \ll P_{LC} \ll P_{PCD} \qquad (2)$$

Considering the properties of the photoconductive layer, increasing $P_{PCD}$ will increase the value of $P_{PCD}/P_{PCL}$.

As a method for attaining the object, the following two methods (a) and (b) can be considered.

(a) Using an i type film having a large band gap as a blocking layer and further overlaying an i type light absorbing layer, having a smaller band gap than the former i type film, allows the formation of an i—i type hetero junction, thereby enlarging an actual value of $P_{PCD}$.

(b) Or a III group element such as boron (or V group element such as phosphorus) is doped into a film having a wide band gap to form a blocking layer. Subsequently an i-type light absorbing layer having a narrower band gap than that of the blocking layer is overlaid to provide a p-i junction (or n-i junction) with the photoconductive layer to which a reverse bias is applied to enlarge an effective $P_{PCD}$.

In other words, properties required of a material which forms the blocking layer include a wide band gap which inhibits the absorption of writing light. When the band gap of the blocking layer is small, the writing light is absorbed by the blocking layer before it is absorbed by the light absorbing layer with a result that the photosensitivity deteriorates. To overcome such a drawback, an alloy type amorphous silicon such as a-SiC, a-SiN and a-SiO which has a wide band gap as a material for a blocking layer is used.

Preparing an alloy film made of a-SiC, a-SiN and the like by plasma CVD method (hereinafter referred to as PCVD method) or sputtering method requires as a material gas a mixture such as $SiH_4+CH_4$ and $SiH_4+NH_3$ to complicate the preparation process, which constitutes a factor of increasing the cost.

Besides, the process of laminating the alloy type blocking layer with the non-alloy type-light absorbing layer suffers from a drawback that such process will cause the contamination of carbon, nitrogen and oxygen atoms in the blocking layer into the light absorbing layer, thereby failing in giving desired properties.

On the other hand, Japanese Laid-Open Patent No. SHO 58-34435/1983 Publication discloses a three-layered photoconductor coupled liquid crystal light valve having a photoconductive layer formed with PCVD method. As an embodiment thereof, the following three methods are disclosed;

(1) a method for forming a p-i-n structure consisting of an i-layer formed by using a-Si:H film, a p-layer and an n-layer provided on both side of said. i-layer by doping phosphorus and boron respectively therein.

(2) a method for forming a three-layer structure consisting an i-layer using an a-Si:H film, an alloy type blocking layer having a wide band gap such as a-Si:C:H film and a-Si:N:H film provided on the side of the transparent electrodes, and an n-layer doped with phosphorus and the like and provided on the opposite side of the transparent electrodes.

(3) a method for forming a three-layer structure consisting an i-layer using an a-Si:H layer, a thin metal film formed of platinum, gold and molybdenum and the like provided on the side of the transparent electrodes, and an n-layer doped with phosphorus and the like and provided on the opposite side of the transparent electrodes.

However, the above Publication does not disclose any method for overcoming drawbacks such as a complicated process for manufacturing the above liquid crystal light valve. The PCVD method used in forming a photoconductive layer inevitably results in producing $(SiH_2)$ powders in the deposition chamber. The publication does not disclose any method for overcoming a drawback that defects are produced in formed films owing to the deposition of $(SiH_2)$ powders on the substrate of formed films.

Besides, Japanese Laid-Open Patent Publication No. HEI 3-126920/1991, HAYAKAWA/SHARP, and corresponding U.S. Pat. No. 5,239,397 discloses a photoconductor coupled liquid crystal light valves having a photoconductive layer formed with ECR method. Although the Publication discloses an improvement in inhibiting the production of $(SiH_2)_n$ powders in the deposition chamber, it does not disclose the provision of a blocking layer for storing an image with a favorable contrast.

SUMMARY OF THE INVENTION

The present invention has been made to overcome the above drawback. Thus, according to the invention both a blocking layer and a light absorbing layer in a liquid crystal light valve are made of non-alloy a-Si:H which eliminates the need of using $CH_4$ and $NH_3$ as material gas and allows reduction of the production cost. In addition, conventional problem of carbon, nitrogen and oxygen atoms in the blocking layer contaminating into the light absorbing layer can be prevented and a favorable image with a clear contrast can be stored in the liquid crystal light valve.

Accordingly, the present invention provides a photoconductor coupled liquid crystal light valve comprising at least one pair of transparent electrodes, a liquid crystal layer and a photoconductive layer showing blocking properties both sandwiched between said transparent electrodes, wherein said photoconductive layer includes a light absorbing layer and a blocking layer having a band gap wider than said light absorbing layer, both said light absorbing layer and said blocking layer being formed of non-alloy a-Si that can be doped with boron and phosphorus.

BRIEF DESCRIPTION OF THE DRAWINGS

The present invention will be detailed by way of the drawings in which.

DESCRIPTION OF THE PREFERRED EMBODIMENT

Figure 1:
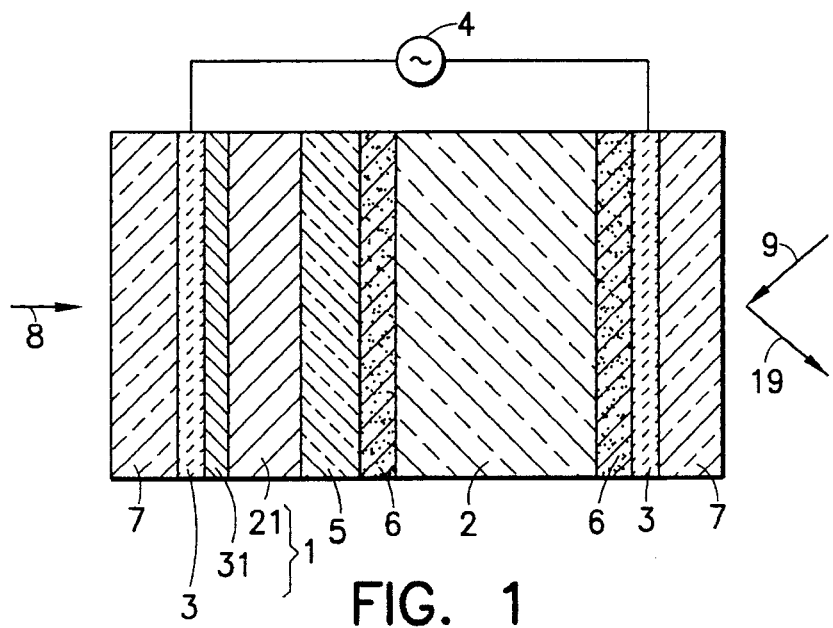
FIG. 1 is a schematic view illustrating a construction of a photoconductor coupled liquid crystal light valve according to the present invention.

A photoconductor coupled liquid crystal light valve according to the present invention comprises at least one pair of transparent electrodes, a liquid crystal layer and a photoconductive layer.

Such pair of transparent electrodes are formed of, for example, indium tin oxide (ITO) and tin oxide (SnO).

The liquid crystal layer is formed of, for example, cholesteric nonanoate.

The photoconductive layer includes a light absorbing layer and a blocking layer. The blocking layer is arranged on the side of the electrode whereas the light absorbing layer is arranged on the liquid crystal layer. When the blocking layer shows a band gap wider than the light absorbing layer, a favorable image with a clear contrast can be stored therein. The photoconductive layer is formed of a non-alloy a-Si, and preferably prepared with Electron Cyclotron Resonance method (ECR method).

In other words, an a-Si film formed with ECR method is more rich hydrogen content than a-Si film formed with. PCVD method. The a-Si film of the present invention is considered to be different from the conventional a-Si film in the bonding conditions between silicon atoms and hydrogen atoms just because the film contains a large amount of hydrogen. Owing to such bond different from the conventional counterparts, the blocking layer in the liquid crystal light valve of the present invention shows a wide band gap, and impurities can be effectively doped therein.

Besides, when the blocking layer is formed by using ECR method, a film with a sufficiently wide band gap can be formed of non-alloy a-Si and impurities can be doped therein. Therefore, a film formed of different material such as a-SiC and a-SiN need not be used to prepare the blocking layer. In other words, the kinds of material gas to be used in preparing the layer can be quite few in number, thereby enabling the simplification of the process for preparing the liquid crystal light valve to reduce the cost of production.

Silicon compounds used for forming a film needed for the photoconductive layer include those containing hydrogen and a halogen such as $SiH_4$, $SiF_4$, $Si_2H_6$ and $Si_2F_6$ and the like.

Impurities to be used for doping to prepare a p-type a-Si include boron and the like whereas impurities to be used for doping to prepare a n-type a-Si include phosphorus and the like.

The blocking layer and the light absorbing layer must satisfy the conditions shown hereinbelow to form films with ECR method. A film for the blocking layer is formed under the following conditions: the silicon compound gas flow rate of 0.1 to 100 sccm, or preferably 0.5 to 5 sccm; inactivated gas flow rate of 10 to 200 sccm, or preferably 50 to 150 sccm; micro-wave output of 100 to 1000 w, or preferably 500 to 700 w; $H_2$ flow rate of 1 to 100 sccm, or preferably 10 to 20 sccm; gas pressure of 0.1 to 10 mTorr, or preferably 1.0 to 1.5 mTorr. When doping impurities, impurity flow rate 0.1 to 100 sccm (3000 ppm when diluted with $H_2$), or preferably 0.5 to 50 sccm. The thickness of the blocking layer prepared under the above conditions ranges between 10 to 1000 Å, or preferably 50 to 200 Å. The band gap in the blocking layer thus prepared 2.2 to 1.98 eV.

The film for the light absorbing layer is formed under the following conditions; silicon compound gas flow rate of 10 to 500 sccm, or preferably 100 to 300 sccm, inactivated gas flow rate of 1 to 100 sccm, or preferably 10 to 50 sccm; micro-wave output of 1 to 5 kw, or preferably 2 to 3 kw, gas pressure of 0.1 to 100 m Torr, or preferably 5 to 20 mTorr. The thickness of the film ranges between 1000 and 200,000 Å, or preferably 10,000 to 1000,000 Å. The band gap of the light absorbing layer prepared under the above conditions ranges between 1.6 to 1.8 KeV.

The blocking layer prepared with ECR method shows a very large band gap value ranging between 2.2 to 1,98 eV, though the layer is made of non-alloy material free of carbon, nitrogen, and oxygen atoms. The photoconductive layer having the above blocking layer and a light absorbing layer formed of an a-Si:H film with a band gap of 1.6 to 1.8 ev overlaid thereon shows a much larger effective $P_{PCD}/P_{PCL}$ representing a ratio of specific resistance at the time of applying a writing light to the counterpart at the time of not applying it than a photoconductive layer with no blocking layer. Besides, forming the blocking layer of non-alloy type s-Si:H allows the inhibition of deterioration in the photosensitivity owing to the inflow of carbon, nitrogen and oxygen atoms into the light absorbing layer.

Further, the blocking layer can be doped with impurities. When $B_2H_6/SiH_4$ contained in the material gas is 5%, doping boron allows the formation of a blocking layer having a very wide band gap of 1.98 eV. In addition, the value of dark conductivity can increase by 5 to 6 order. Even using a blocking layer doped with boron produces a much larger effective $P_{PCD}/P_{PCL}$ representing a ratio of resistivity at the time of applying a writing light to the counterpart at the time of not applying it in the state of a reverse bias application of light to give the same effect as using a blocking layer non-doped with boron.

Thus, forming both the blocking layer and the light absorbing layer of non-alloy a-Si eliminates the need of using $CH_3$ and $NH_4$ as a material gas, thereby reducing the production cost.

Examples of the present invention will be detailed hereinbelow.

EXAMPLE 1

Figure 2:
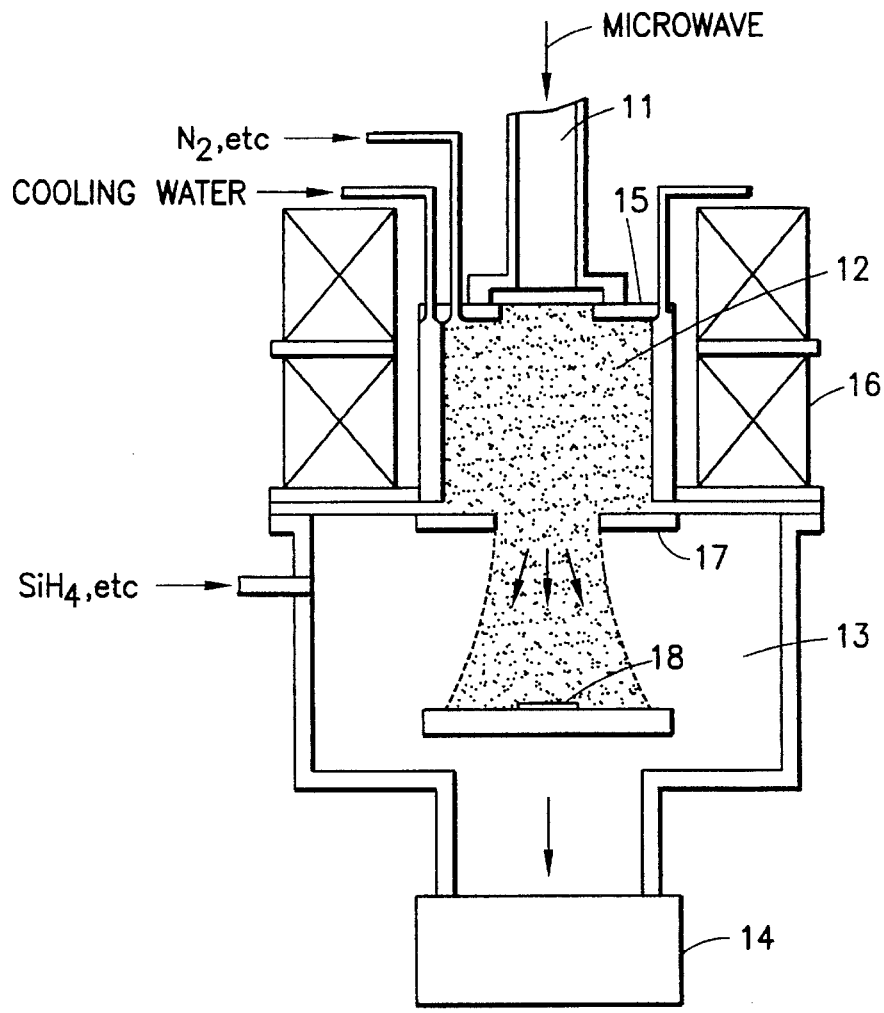
FIG. 2 is a schematic view illustrating a construction of a film forming device by ECR method.

Initially, a construction of an a-Si film forming device using ECR method will be detailed hereinbelow. FIG. 2 shows a construction of a film forming device using ECR method.

The film forming device is provided with a rectangular waveguide pipe 11, a plasma generating chamber 12, a deposition chamber 13 and an exhaust system 14. The plasma generating chamber 12 consists of a cavity resonator to which a microwave is introduced through the rectangular waveguide 11. Incidentally, a microwave introducing window 15 for introducing a microwave from the conducting pipe 11 is formed of quartz glass which easily transmits the microwave.

In the vicinity of the plasma generating chamber 12 was disposed a magnetic coil 16 which drew into the deposition chamber 13 plasma generated in the plasma generating chamber 12 by applying a divergent magnetic field. In the deposition chamber 13 a substrate 18 was disposed. The substrate 18 is consisted of a glass substrate having a transparent electrode 3 overlaid thereon and transmitting a writing light 8.

In the process of forming a film, the plasma generating chamber 12, a deposition chamber 13 through an exhaust system, followed by introducing a material gas. The material gas to be used in the process consisted of a silicon compound containing hydrogen or halogen such as $SiH_4$ and $SiF_4$. A doping gas consisted of a mixture of $B_2H_6$ diluted with hydrogen and added with a proper amount of inactivated gas such as Ar and the like. The gases were introduced into the deposition chamber 13. After introducing these gases, a microwave was introduced into the plasma generating chamber 12 with the gas pressure maintained at a predetermined value while applying a magnetic field, thereby exciting a plasma. Consequently, gases converted into plasma was introduced to the substrate with the divergent magnetic field to deposit a-Si layer on the substrate. In this example, the substrate was not heated.

Incidentally, adjusting the position of a window 17 for drawing out plasma and the size thereof can improve the uniformity of the film thus prepared.

Figure 3:
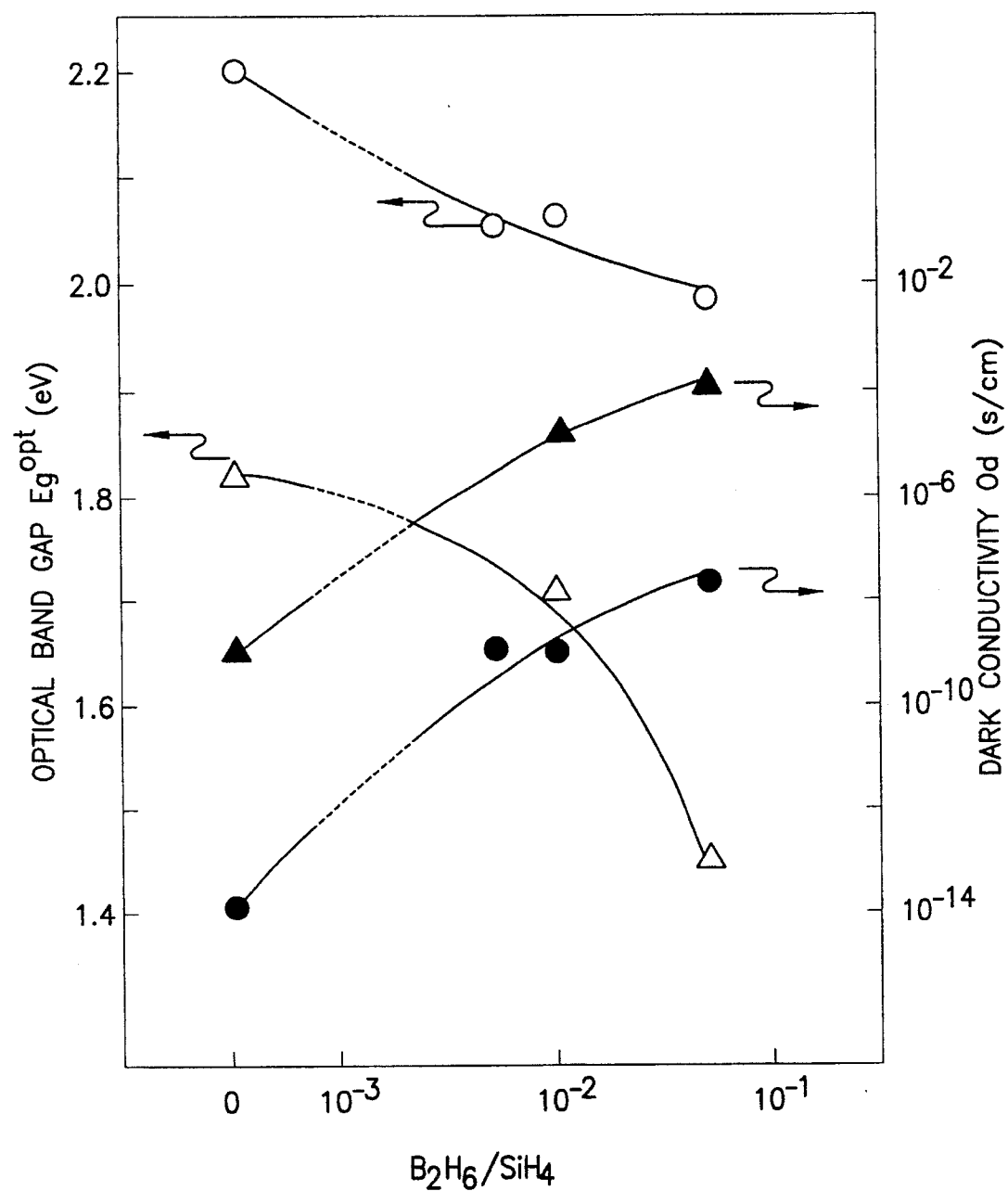
FIG. 3 is a schematic view showing relations between the amount of doped boron in a photoconductive layer thus formed in the present invention, an optical band gap and dark conductivity.
Figure 4:
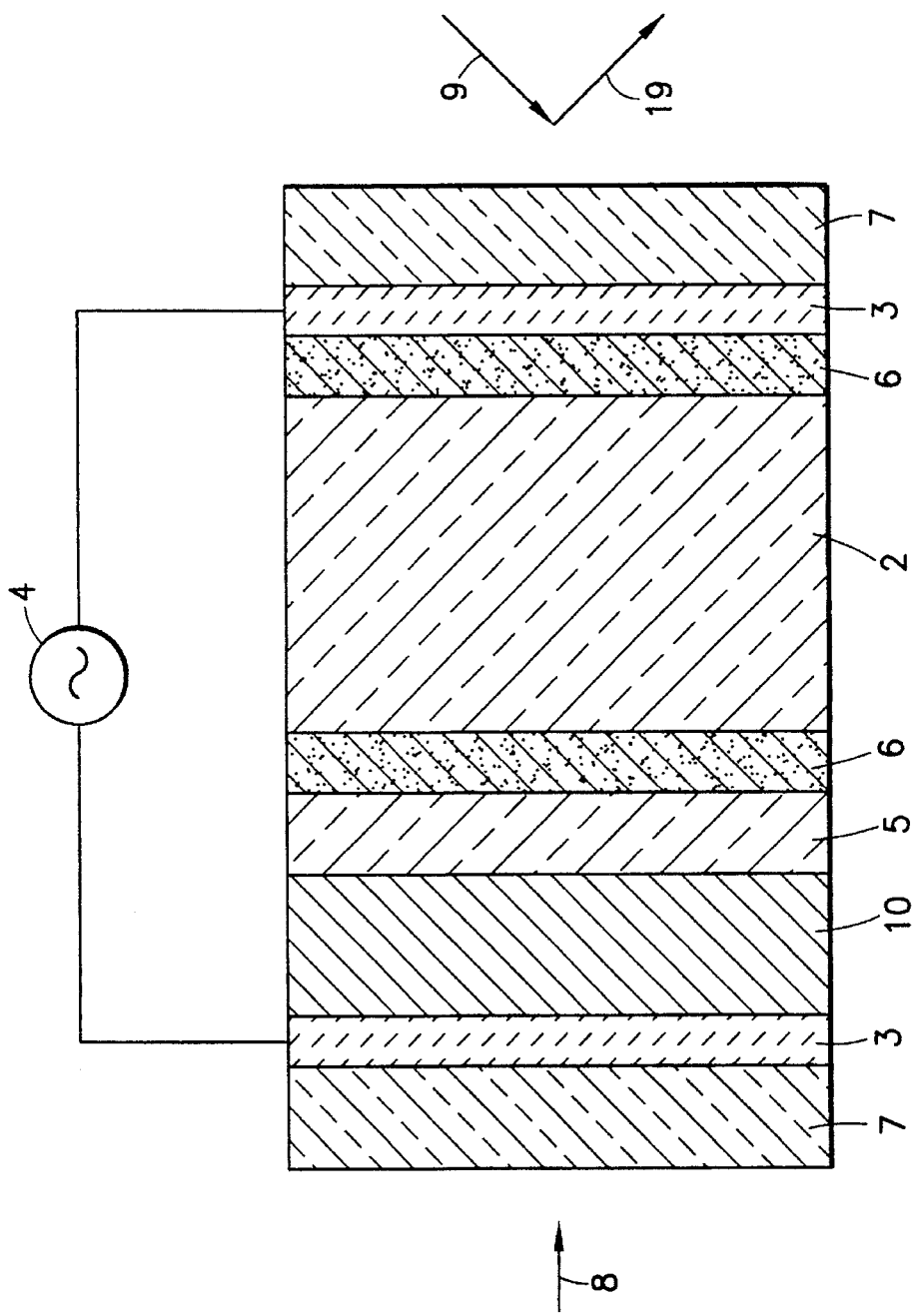
FIG. 4 shows a schematic view illustrating a construction of a general liquid crystal light valve.

Table 1 shows film forming conditions under which a blocking layer formed of a-Si using such a film forming device. FIG. 3 shows relations between the amount of doped boron and optical band gap as well as relations between the amount of doped boron and the dark conductivity which are represented by ○, ●. Table 2 shows film forming conditions using a PCVD method which is given as a comparative example. FIG. 3 shows film properties which represented by △, ▲ like FIG. 3.

TABLE 1

| film forming conditions by ECR method (films doped with boron) | |
|---|---|
| $SiH_4$ flow rate | 1 sccm |
| $B_2H_6$ flow rate (diluted with hydrogen to 3000 ppm) | 0 to 17 sccm ($B_2H_6/SiH_4$ = 0 to 5%)* |
| Ar flow rate | 100 sccm |
| micro wave power | 560 kW |
| gas pressure | 1.0 mTorr |

(*When impurities are not doped, 15 sccm of $H_2$ was supplied in the place of $B_6H_6$.)

TABLE 2

| film forming conditions by PCVD method | | |
|---|---|---|
| non-doped film | $SiH_4$ flow rate | 25 sccm |
| | $B_2H_6$ flow rate | 40 sccm |
| | RF power | 20 W |
| | gas pressure | 0.2 Torr |
| | substrate temperature | 250° C. |
| film doped with boron | $SiH_4$ flow rate | 10 sccm |
| | $B_2H_6$ flow rate (diluted with hydrogen to 5.42%) | 1.85 to 9.3 sccm ($B_2H_6/SiH_4$ = 1 to 5%) |
| | Ar flow rate | 100 sccm |
| | microwave power | 560 kW |
| | gas pressure | 1.0 mTorr |
| | substrate temperature. | 250 to 300° C. |

FIG. 3 shows that a film formed with ECR method is not doped with impurifies having a wide band gap of 2.2. eV which is larger than the counterpart of a film formed with sinral PCVD method.

It further shows that dark conductivity $\sigma_d$ increases along with the increase of the amount of doped impurities. When the band gap showed a very large value of 1.98 eV in the case of $B_2H_6/SiH_4=5\%$ in the material gas. Films having such a wide band gap and allowing impurities to be doped therein cannot be prepared with a conventional PCVD method. It can be prepared only with ECR method.

Besides, the blocking layer has a wide band gap and impurities can be effectively doped therein just because the layer contains a larger amount of hydrogen than an a-Si film prepared with a conventional PCVD method, and the state of bonding between Si atoms and H atoms in the blocking layer is different from the conventional counterpart.

EXAMPLE 2

Subsequently, an example of a photoconductor coupled liquid crystal light valve having a photoconductive layer showing blocking properties will be shown. FIG. 1 shows a schematic view of such example. Referring to FIG. 1, reference numeral 31 designates a blocking layer, 21 a light absorbing layer.

Preparation Example 1: a photoconductor coupled liquid crystal light valve having a blocking layer formed of non-doped a-Si Example 2 of the photoconductor coupled liquid crystal light valve of the present invention was formed of the following elements under the conditions shown hereinbelow;

Substrate glass: CORNING #7059

Transparent electrode: ITO was vapor deposited on the substrate glass.

| Photoconductive layer | | |
|---|---|---|
| Blocking layer: | $SiH_4$ flow rate | 1 sccm |
| | Ar flow rate | 100 sccm |
| | microwave output | 550 w |
| | $H_2$ flow rate | 15 sccm |
| | gas pressure | 1 mtorr | a-Si:H film formed to a thickness of 100 Å under the above condition

| Light absorbing layer: | $SiH_4$ flow rate | 120 sccm |
|---|---|---|
| | Ar flow rate | 20 sccm |
| | microwave output | 2.5 kw |
| | gas pressure | 12 mTorr | a-Si:H film formed to a thickness of about 3 to 10 μm under the above conditions.

Reflecting layer: formed of laminated material having different refractive index. The thickness of the reflective layer ranges between 0.05 to 0.1 mm. Concretely, the reflecting layer consisted of a dielectric mirror having 10 to 15 layers of MgF-ZnS, Si-SiO$_3$ and the like. However, in the present invention, a combination of Si-SiO$_2$ is desirable to prevent the photoconductive layer from being contaminated with other atoms than Si.

Orientation treatment film: After applying silane treatment agent on the reflecting layer, the layer was subjected to a high temperature treatment.

Liquid crystal layer: A chiral agent (such as cholesteric nonanoate and the like) 7 to 8 wt. % was mixed with phenylcyclohexane series to form a liquid crystal layer having a thickness of 7 to 8 μm and a twisted pitch of about 20% of the thickness of the layer.

Preparation Example 2: a photoconductor coupled liquid crystal light valve having a blocking layer doped with boron ($B_2H_6/SiH_4$ in the material gas=5%)

Conditions are the same with preparation example 1 except the conditions for forming a blocking layer. The conditions for the blocking layer is shown below.

| Photoconductive layer: | | |
|---|---|---|
| Blocking layer: | $SiH_4$ flow rate | 1 sccm |
| | Ar flow rate | 100 sccm |
| | $B_2H_6$ (diluted to 3000 ppm with $H_2$) | 17 sccm |
| | ($B_2H_6/SiH_4$ in supplied gas = 5%) | |
| | microwave output | 550 w |
| | gas pressure | 1 mtorr | a-Si:H film formed to a thickness to about 100 Å under the above conditions.

Writing an image on the photoconductor coupled liquid crystal light valve thus prepared by applying a square wave pulse at 150 V from means for applying voltage 4 using as a writing light 5 mW semiconductor laser having a wavelength of 670 nm or a white light such as a halogen light source gave a favorable contrast ratio to show that the photoconductive layer has an excellent photosensitivity.

The photoconductor coupled liquid crystal light valve of the present invention has a blocking layer formed in a photoconductive layer so as to provide blocking properties in said blocking layer. The blocking layer comprises a non-doped a-Si having a wide band gap or an a-Si doped with impurities by ECR method. Such a construction of the liquid crystal light valve allows the preparation of the liquid crystal light valve having a sufficient photosensitivity and enlarged ratio of specific resistance in the dark state against the counterpart in the bright state to show a favorable contrast. Further, forming the blocking layer and the light absorbing layer of a-Si can simplify the process for preparing the liquid crystal light valve to reduce the cost of production.

In addition, forming an a-Si layer with a conventional PCVD method or sputtering method cannot prevent the generation of $(SiH_2)_n$ powders in the deposition chamber. The powders thus generated deposits on the substrate for forming a film to cause a defect in the film thus prepared. On the other hand ECR method can inhibit the generation of such powders to prevent such defects in the formed film, thereby improving the yield ratio in the preparation of the device.

What is claimed is:

1. A photoconductor coupled liquid crystal light valve comprising at least a pair of transparent electrodes, a liquid crystal layer and a photoconductor layer having blocking properties, both said layers being sandwiched between said transparent electrodes, wherein said photoconductor layer includes a light-absorbing layer and a blocking layer, both formed of non-alloy amorphous silicon;

said blocking layer is doped with an impurity selected from the group consisting of boron and phosphorus and has a band gap exceeding 1.98 eV, wider than that of said light-absorbing layer, thereby inhibiting absorption, by said blocking layer, of writing light and enhancing contrast of any image formed by said light valve.

2. The photoconductor coupled liquid crystal light valve of claim 1, wherein said light-absorbing layer has a band gap of 1.6 to 1.8 eV.

3. A method of manufacturing a photoconductor coupled light valve having at least a pair of transparent electrodes, a liquid crystal layer and a photoconductor layer having blocking properties, both said layers being sandwiched between said transparent electrodes, wherein said photoconductor layer includes a light-absorbing layer and a blocking layer, both formed of non-alloy amorphous silicon;

said blocking layer is doped with an impurity selected from the group consisting of boron and phosphorus, and has a band gap exceeding 1.98 eV, wider than that of said light-absorbing layer, including the step of depositing said photoconductive layer onto one of said transparent electrodes by an electron cyclotron resonance method.

* * * * *